D. BOTH.
MANE HOLDER.
APPLICATION FILED MAY 11, 1914.
1,131,903.
Patented Mar. 16, 1915.
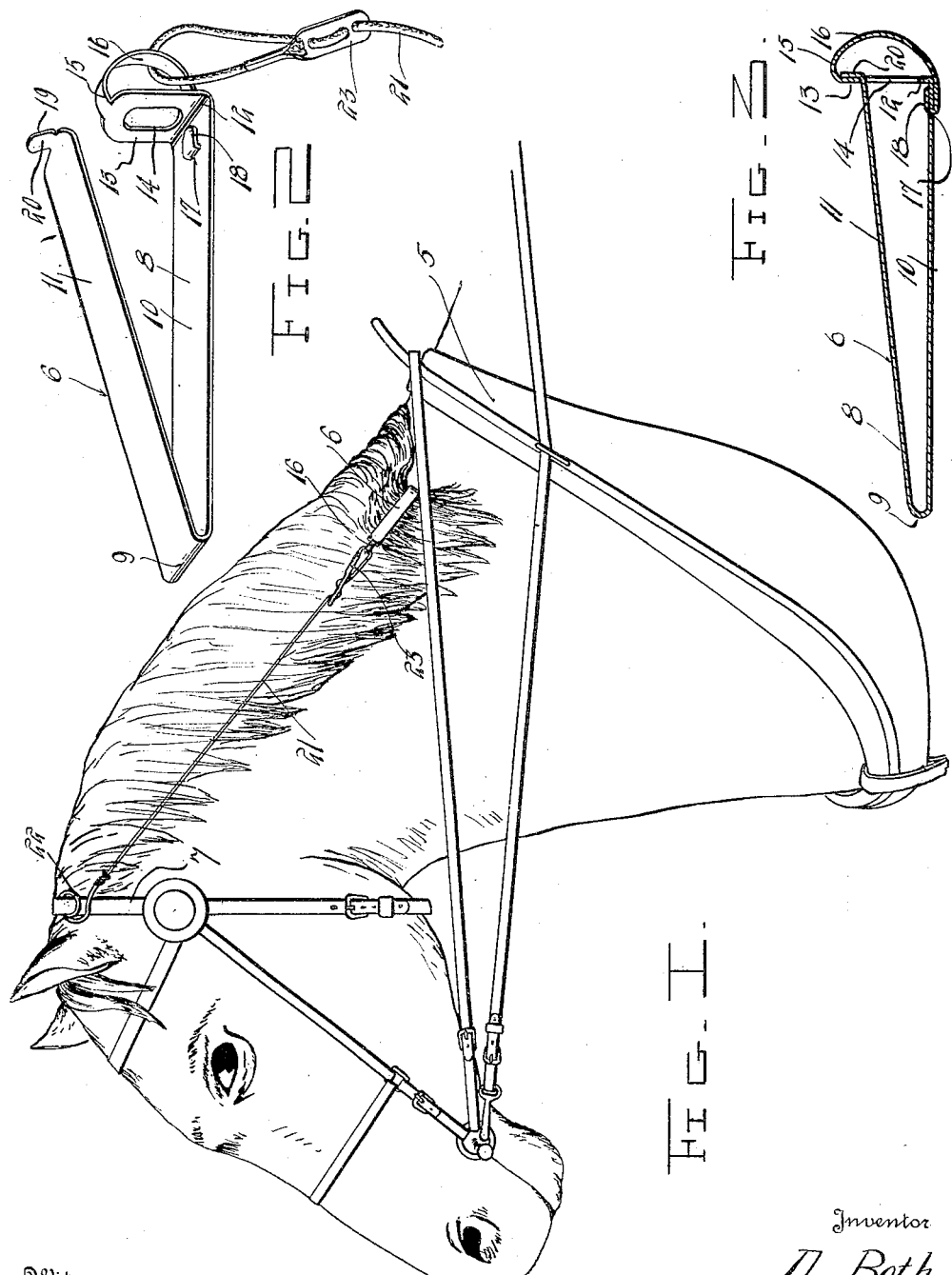
Inventor
D. Both.
By
Attorneys
Witnesses

UNITED STATES PATENT OFFICE.

DAVID BOTH, OF ST. JOHNS, MICHIGAN.

MANE-HOLDER.

1,131,903. Specification of Letters Patent. Patented Mar. 16, 1915.

Application filed May 11, 1914. Serial No. 837,850.

*To all whom it may concern:*

Be it known that I, DAVID BOTH, a Hungarian subject, residing at St. Johns, in the county of Clinton, State of Michigan, have invented certain new and useful Improvements in Mane-Holders; and I do hereby declare the following to be a full, clear, and exact description of the invention, such as will enable others skilled in the art to which it appertains to make and use the same.

My invention relates to a harness device and has particular reference to a device for preventing the mane of a horse from getting under the collar.

It is well known among farmers and others that when a horse is being worked and becomes sweaty, the mane works under the collar and sticks there, causing irritation and soreness on account of the friction of the collar. This can, of course, be remedied by cutting the mane, but one is loath to resort to such an expedient, especially as a horse's mane is often such an attractive feature of its appearance.

My invention is designed for the purpose of eliminating these objectionable features and has for its object the provision of a novel device for engaging the mane near the collar and holding it so that it cannot possibly work under the collar.

More specifically, the object is to provide a hooked loop structure adapted to engage the mane and connected with a portion of the harness for holding the mane away from the collar.

With these and other objects in view, such as simplicity, cheapness in manufacture, ease of application, efficiency in service and the general improvement of the art, my invention consists in the novel arrangement and construction of parts as will be hereinafter fully described, and illustrated in the accompanying drawings, in which—

Figure 1 is a view of a horse's head and neck showing my device applied and engaging the mane, Fig. 2 is a perspective view of the hook loop detached and open, and Fig. 3 is a longitudinal sectional view thereof in its closed position.

Referring more particularly to the drawings, the numeral 5 designates the usual collar secured upon the neck of a horse, as shown.

My device is adapted to engage the mane, is designated as a whole by the numeral 6, and is adapted to be attached to a portion of the bridle 7, as shown.

My device is in the form of a closable loop adapted to encircle a portion of the mane and comprises preferably, a single strip 8 of resilient material such as spring steel or brass, bent upon itself, as shown at 9, to form parallel extending arms 10 and 11. The arm 10 is bent at a substantially right angle as shown at 12, to form an angular extension 13 which is provided with an opening 14 to form one element of a catch to be described. The material is then formed with a reduced portion 15 which is bent into a loop 16 which has its end inserted within a slot 17 formed in the arm 10 adjacent the bend 12, after which it is bent over, as at 18 to prevent its withdrawal.

The arm 11 is provided at its free end with a reduced portion 19 which is bent to form a tongue 20 adapted to be disposed in the opening 14 to serve as the other element of the catch. As the material of this member is resilient, and the arm 11 has a tendency to spring outward, as shown in Fig. 2, it will be apparent that when the arm 11 is pressed down, the extension 13 will spring outwardly until the reduced portion 19 engages within the opening 14, and the tongue 20 will be disposed outwardly of the extension 13 and be held firmly by the resilience of the material.

The device is applied by releasing the catch to allow the arms 10 and 11 to spring apart, and then the portion of the horse's mane near the collar 5 is grasped and slid between the arms 10 and 11 after which they are pressed together to close the catch, forming a clamp.

In order to secure the device to some part of the harness for drawing the mane away from the collar, I provide a cord or strap 21 provided at one end with a hook member 22 adapted to be attached to some suitable portion of the bridle as shown. The cord 21 passes through the loop 16 and is provided upon its free end with a plate 23 provided with three holes for the passage of the cord in order to form a take up device for shortening or lengthening the cord for accommodating the device to different horses, and applying proper tension for holding the mane.

From the foregoing it will be apparent that I have provided a device which is easily applied and which will hold the mane away from the collar of the horse.

It will be understood that I may make such changes in the form, construction and arrangement of parts as will not depart from the spirit of the invention and without limiting the scope of the sub-joined claim.

Having thus described my invention, I claim:

In a mane holder, a clamp comprising a single strip of material bent upon itself to form spaced, substantially parallel arms, an angularly extending tongue formed on the free end of one of said arms, an angular extension formed on the other of said arms and provided with an opening for the passage of said tongue, said last named arm being also provided with a slot adjacent such angular extension, and a reduced portion extending from said angular extension, reflexly bent and having its end passing through the slot in said second named arm adjacent said angular extension.

In testimony whereof, I affix my signature, in the presence of two witnesses.

DAVID BOTH.

Witnesses:
JOHN BURK,
I. N. EAGLE.

Copies of this patent may be obtained for five cents each, by addressing the "Commissioner of Patents, Washington, D. C."